(12) United States Patent
Hirano

(10) Patent No.: US 7,613,355 B2
(45) Date of Patent: Nov. 3, 2009

(54) IMAGE PROCESSING DEVICE AND REGISTRATION DATA GENERATION METHOD IN IMAGE PROCESSING

(75) Inventor: Takashi Hirano, Osaka (JP)

(73) Assignee: Keyence Corporation, Osaka (JP)

( * ) Notice: Subject to any disclaimer, the term of this patent is extended or adjusted under 35 U.S.C. 154(b) by 680 days.

(21) Appl. No.: 11/373,157

(22) Filed: Mar. 13, 2006

(65) Prior Publication Data

US 2006/0210338 A1 Sep. 21, 2006

(30) Foreign Application Priority Data

Mar. 14, 2005 (JP) ............................ P.2005-070741

(51) Int. Cl.
*G06K 9/40* (2006.01)
*G06K 9/48* (2006.01)
(52) U.S. Cl. ...................................... 382/266; 382/199
(58) Field of Classification Search ................ 382/266, 382/267, 268, 269, 199, 286
See application file for complete search history.

(56) References Cited

U.S. PATENT DOCUMENTS 5,412,742 A * 5/1995 Takasaki et al. .............. 382/316
5,680,471 A * 10/1997 Kanebako et al. ............ 382/128
6,901,171 B1 * 5/2005 Dutta-Choudhury et al. ..... 382/266

FOREIGN PATENT DOCUMENTS

JP 06-044399 2/1994
JP 10-038542 2/1998

OTHER PUBLICATIONS

Akio Okazaki, "First-time Image Processing Technique," Kogyo Chosakai Publishing Inc., First Edition First Printing issued on Oct. 20, 2000, pp. 1-6E (with partial English-language translation of p. 5, lines 5-6 attached).

* cited by examiner

*Primary Examiner*—Yon Couso
(74) *Attorney, Agent, or Firm*—Drinker Biddle & Reath LLP

(57) ABSTRACT

In an image processing device, a contour image generation section extracts edge points according to image data acquired by an image acquiring section, and generates a contour image of a object formed out of the edge points; a first fitting line generation section conducts fitting of line of a predetermined shape to the object on the contour image according to the contour image, and generates a first fitting line; an effective edge point region generation section generates an effective edge point region in which the first fitting line has a width and a region in the line width is made to be the effective edge point region; and a second fitting line generation section generates a second fitting line formed out of a line of a predetermined shape according to the edge points in the effective edge point region on the contour image.

4 Claims, 14 Drawing Sheets

FLOW OF PRODUCTION LINE

IMAGE PROCESSING DEVICE AND REGISTRATION DATA GENERATION METHOD IN IMAGE PROCESSING

The present application claims foreign priority based on Japanese Patent Application No. 2005-070741, filed Mar. 14, 2005, the content of which is incorporated herein by reference.

BACKGROUND OF THE INVENTION

1. Technical Field

The present invention relates to an image processing device and a registration data generation method conducted in the image processing. More particularly, the present invention relates to improvements in an image processing device for generating registration data related to a contour of an object according to image data acquired by an image acquiring unit.

2. Related Art

There is provided an image processing device in which the automatic discrimination of a work (an object to be inspected) is conducted as follows. According to image data obtained when the work is acquired, a contour of the object is extracted and matching processing is conducted on this contour. According to the above automatic discrimination, for example, it is possible to specify a type of moldings or parts made by press working. Further, it is possible to specify a position of a mark printed on a base board.

In this type matching processing, edge points are extracted from an acquired image obtained when the work is acquired. These edge points are extracted according to a change in the luminance level of adjoining pixels, and a contour image of an object is formed by thus extracted edge points. This contour image is matched with registration data and the work is discriminated according to the result of the matching.

Registration data used in the matching processing is made according to an acquired image obtained when a sample of the work is acquired. That is, the registration data is made when a line, the shape of which is predetermined, is fitted to the contour of the object on the acquired image with respect to the acquired image of the sample. This operation conducted on the contour of the object is called "fitting", and a line obtained by fitting is called "a fitting line". Specifically, the registration data is made in such a manner that an operator for operating the image processing device designates an appropriate size according to a contour of the object while the operator is enlarging, reducing and moving a line, the shape of which is predetermined, on an image plane on which the acquired image is displayed.

In the above image processing device, a size of the fitting line is designated according to an operation input given by the operator. Therefore, the size of the designated fitting line is different for each operator. Accordingly, the accuracy of fitting is low. Especially, in the case where blur is caused on an image because the image is out of focus or in the case where the image quality is deteriorated by noise, it is difficult for the operator to distinguish the contour of the object on the acquired image on the image plane. Therefore, the accuracy of fitting is further lowered.

Therefore, it is considered to take the following countermeasure. Edge points are extracted from the acquired image of the object. A regression calculation is conducted on the thus extracted edge points and the fitting lines are automatically found. However, this countermeasure is disadvantageous as follows. In the case where the object itself has a defect such as a portion which is broken off, it is impossible to obtain a desired fitting line.

SUMMARY OF THE INVENTION

It is an object of the present invention to provide an image processing device in which the quality of registration data related to a contour of an object is enhanced. It is another object of the present invention to provide a registration data generation method conducted in the image processing. Especially, it is an object to provide an image processing device capable of appropriately generating registration data at all times without the deterioration of the fitting accuracy even when the operator is changed to another person. It is an object of the present invention to provide an image processing device in which the fitting accuracy can be prevented from being deteriorated even when the object itself has a defect such as a portion which has been broken off or even when blur is caused on the image because the image is out of focus or even when the image quality is low because the image is affected by noise.

However, the present invention need not achieve the above objects, and other objects not described herein may also be achieved. Further, the invention may achieve no disclosed objects without affecting the scope of the invention.

The present invention provides an image processing device comprising: a contour image generation unit for extracting edge points according to image data acquired by an image acquiring unit, and generating a contour image of a object formed out of the edge points; a first fitting line generation unit for conducting fitting of a line of a predetermined shape to the object on the contour image according to the contour image, and generating a first fitting line; an effective edge point region generation unit for generating an effective edge point region in which the first fitting line has a width and a region in the line width is made to be the effective edge point region; and a second fitting line generation unit for generating a second fitting line formed out of a line of a predetermined shape according to the edge points in the effective edge point region on the contour image.

In this image processing device, edge points are extracted according to image data, and a contour image of an object formed out of the edge points is generated. A second fitting line formed out of a line of a predetermined shape is generated according to this contour image. In this case, a first fitting line, which is obtained when the line of the predetermined shape is fitted to an object on the contour image, is made to have a width, and a region in the width is made to be an effective edge point region. According to the edge points in this effective edge point region, a second fitting line can be found. When the above constitution is adopted, it is possible to suppress the deterioration of the fitting accuracy when a fitting line related to the contour of the object is found from the contour image and the registration data used for matching processing is generated. That is, the second fitting line is calculated according to the edge points contained in an overlapping portion with the effective edge point region on the contour image. Therefore, the edge points, which are not overlapped with the effective edge point region, are excluded from a group of data for calculating the second fitting line related to the contour of the object. Therefore, even in the case where the object itself has a defect such as a portion which has been broken off, the edge points, which are greatly distant from a desired fitting line, can be automatically excluded. Accordingly, the deterioration of the fitting accuracy can be effectively suppressed.

The fitting line can be automatically found from the image data. Therefore, even when a different operator operates the image processing device, the fitting line of the same size can be always extracted from the image of the same contour. Even in the case where an image is out of focus and blur occurs on the image and even in the case where the image quality is deteriorated when noise is generated, the fitting accuracy of the fitting line can be prevented from deteriorating.

Specifically, the first fitting line generation unit conducts fitting according to the Hough transformation related to the contour image.

In addition to the above constitution, an image processing device of the present invention is composed in such a manner that the effective edge point region generation unit generates the effective edge point region according to a fitting line, the size of which is the largest, in the case where a plurality of the first fitting lines are generated. According to the above constitution, in the case where a plurality of the first fitting lines are extracted from the contour image, the effective edge point region is determined according to the fitting line, the size of which is the largest. Therefore, edge points not related to the fitting line concerned can be excluded.

In addition to the above constitution, an image processing device of the present invention further comprises: a display unit for displaying the effective edge point region together with the contour image on the same image plane; and an effective edge point region correction unit for changing a size and position of the effective edge point region, which are displayed on the image plane, according to an operation input made by an operator, wherein the second fitting line generation unit generates the second fitting line according to the effective edge point region, the size and position of which have been changed. According to the above structure, in the case where the size and position of the effective edge point region are changed by an operation input made by an operator, the second fitting line is calculated according to the effective edge point region after the size and position have been changed. Accordingly, in the case where the effective edge point region, which has been generated by the effective edge point region generation unit, is remarkably different from the object on the contour image, the operator corrects the size and position of the effective edge point region, so that the desired fitting line can be extracted.

A registration data generation method of the present invention comprises steps of: extracting edge points according to image data acquired by an image acquiring unit and generating a contour image of an object formed out of the edge points; conducting fitting of a line of a predetermined shape an object on the contour image according to the contour image and generating a first fitting line; generating an effective edge point region in which the first fitting line is made to have a width and a region in the width is made to be the effective edge point region; and generating a second fitting line formed out of a line of a predetermined line according to edge points in the effective edge point region on the contour image.

According to the image processing device and the registration data generation method conducted in the image processing of the present invention, the fitting line related to the contour of the object can be found according to the edge points in the effective edge point region. Therefore, even when the object itself has a defect such as a portion which has been broken off, it is possible to prevent the fitting accuracy of the fitting line from deteriorating. Further, even when a different operator operates the image processing device, the fitting line can be properly found at all times without causing the deterioration of the fitting accuracy. Even in the case where blur is caused on an image because the image is out of focus and even in the case where the image quality is deteriorated by the generation of noise, the fitting accuracy can be prevented from deteriorating, and it is possible to enhance the quality of registration data related to the contour of the object.

BRIEF DESCRIPTION OF THE DRAWINGS

FIG. 11 is a view showing another example of the generated contour image, wherein FIG. 11 shows circumstances in which a plurality of contours B21 and B22 are extracted as the contour image B11.

FIG. 14 is a view showing an example of the registration data generating operation in the image processing device shown in FIG. 3, wherein FIG. 14 shows the registration data B6 including the second fitting line B7.

DETAILED DESCRIPTION OF THE INVENTION

Embodiment 1

Figure 1:
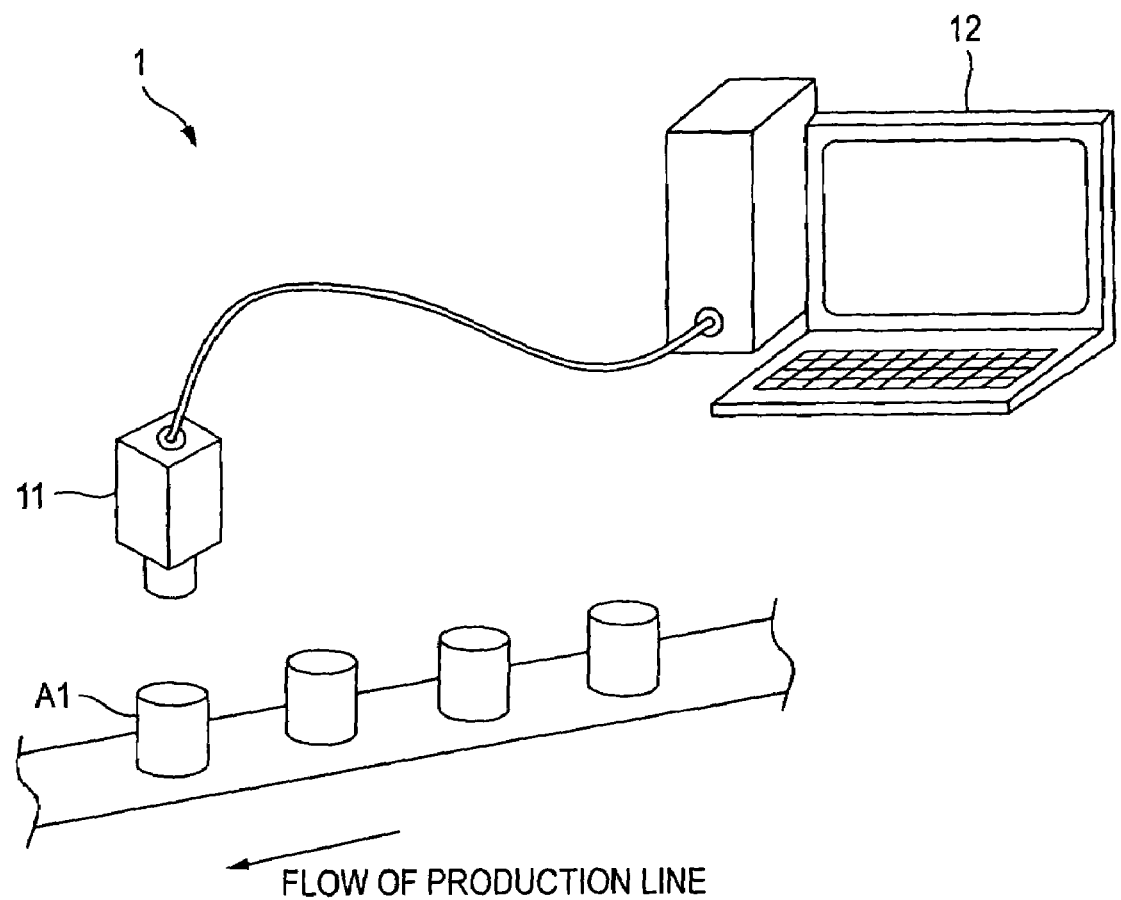
FIG. 1 is a perspective view showing an example of an outline of an arrangement of an automatic discrimination system of exemplary, non-limiting Embodiment 1 of the present invention.

FIG. 1 is a perspective view showing an example of an outline of an arrangement of an automatic discrimination system of exemplary, non-limiting Embodiment 1 of the present invention. In this view, an overall arrangement of the automatic discrimination system 1 is shown. This automatic discrimination system 1 includes: an image acquiring section 11 for acquiring a sample A1 of a work; and an image processing device 12. The automatic discrimination system 1 of this embodiment is an information processing system for automatically discriminating a work (an object to be inspected). For example, the automatic discrimination system 1 discriminates the work according to the registration data extracted from image data obtained when the sample A1 on a conveyance line in a manufacturing process is acquired.

On this conveyance line, a plurality of works is arranged. When these works are conveyed along the conveyance line, the works are successively moved in an acquiring area of the image acquiring section 11. The image acquiring section 11 acquires the work located in an acquiring area, and the thus acquired image is outputted to the image processing device 12. The image processing device 12 generates a fitting line related to the contour of the object according to the image data obtained when the sample A1 of the work is acquired. Then, the image processing device 12 conducts processing so as to register the fitting line as registration data. When a contour image obtained from the acquired image of the work is matched with this registration data, the work can be discriminated.

Figure 2:
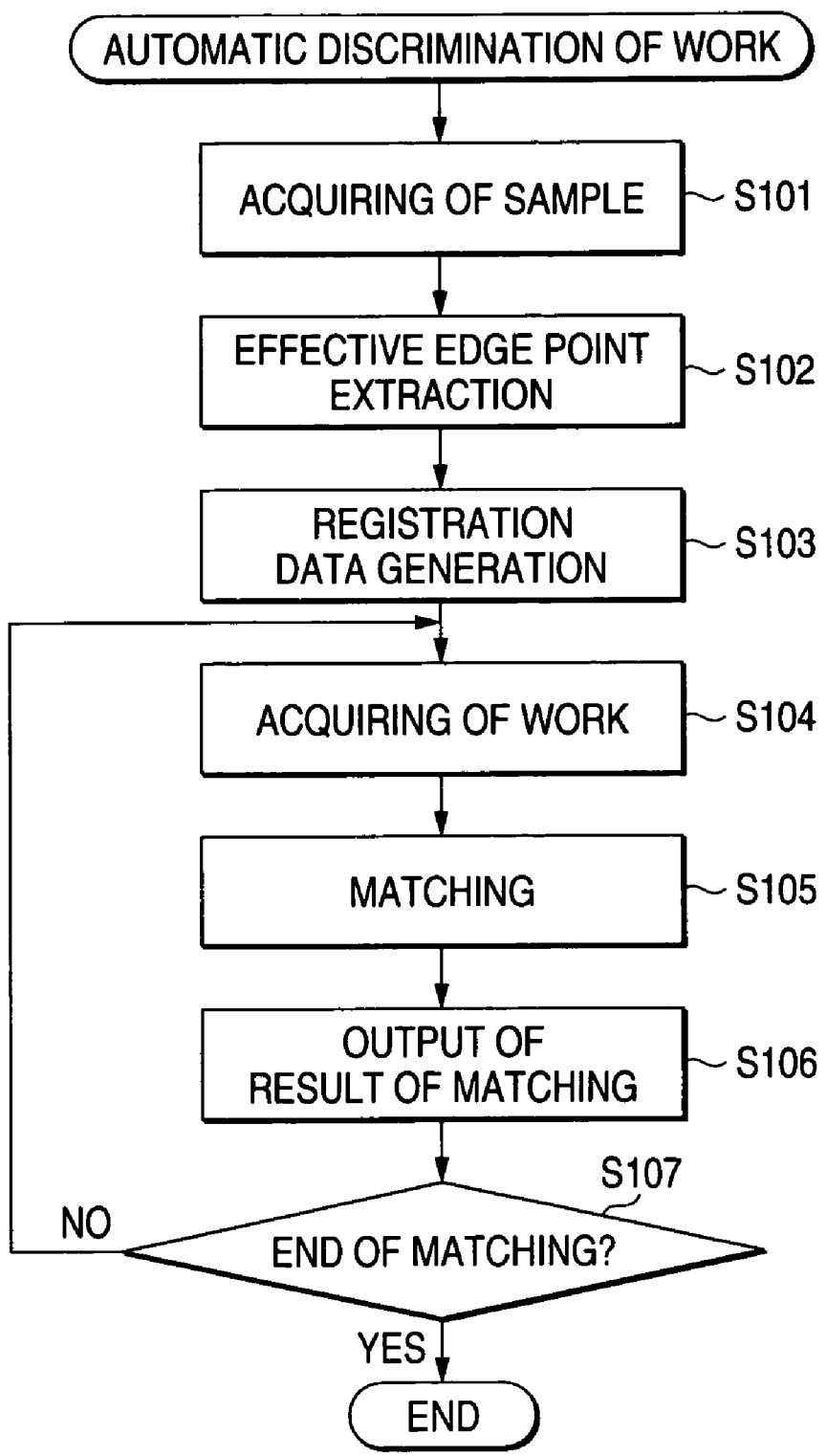
FIG. 2 is a flow chart showing an example of the automatic discriminating operation of discriminating a work by the automatic discriminating system shown in FIG. 1.

Steps S101 to S107 shown in FIG. 2 are a flow chart showing an example of the automatic discrimination operation of discriminating a work by the automatic discrimination system shown in FIG. 1. In this automatic discrimination system 1, in order to obtain registration data used for matching, first, the image acquiring section 11 conducts acquiring on the sample Al of the work (step S101).

According to the image data obtained at this time, a contour image of the object formed out of edge points is generated. According to this contour image, an effective edge point region for selecting the edge points is extracted by the image processing device 12 (step S102). According to the edge points located in the effective edge point region, a fitting line related to the contour of the object is found and accommodated as registration data (step S103).

Next, a work, which is an object to be inspected, is acquired (step S104). According to the acquired image, the work is discriminated. Specifically, edge points are extracted from the acquired image, and when a contour image of the object formed out of the edge points is matched with the registration data, the work can be discriminated (step S105). A result of the discrimination made by this matching processing is outputted to an image display section and displayed on an image plane (step S106).

The procedure shown in steps S104 to S106 is repeated for each work put on the conveyance line until a stoppage signal is inputted. When the stoppage signal is inputted, this automatic discrimination processing is completed (step S107).

Figure 3:
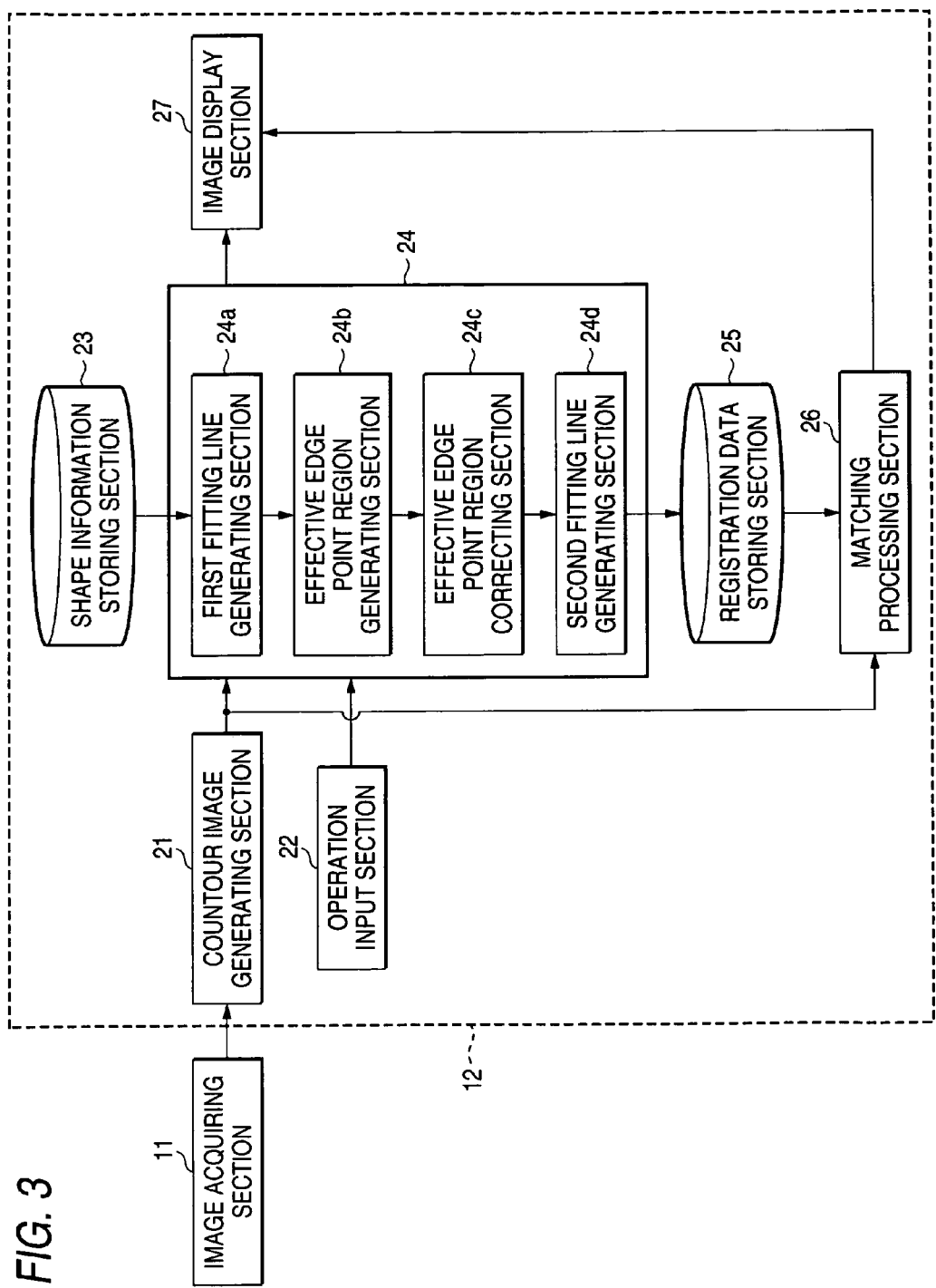
FIG. 3 is a block diagram showing an example of an arrangement in a primary portion of the automatic discriminating system shown in FIG. 1.

FIG. 3 is a block diagram showing an example of an arrangement of a primary portion of the automatic discrimination system shown in FIG. 1. This automatic discrimination system 1 includes: an image acquiring section 11; and an image processing device 12. The image processing device 12 includes: a contour image generating section 21; an operation input section 22; a shape information storing section 23; a registration processing section 24; a registration data storing section 25; a matching processing section 26; and an image display section 27. The registration processing section 24 includes: a first fitting line generating section 24a; an effective edge point region generating section 24b; an effective edge point region correcting section 24c; and a second fitting line generating section 24d, and operation is conducted so as to generate registration data used for matching.

The image acquiring section 11 is a digital camera for acquiring an object with visible rays or infrared rays. This image acquiring section 11 includes image acquiring elements such as CCD (Charge Coupled Device). In the image acquiring section 11, in order to make registration data used for matching processing, the sample A1 of the work is acquired, and luminance data for each pixel is outputted as image data.

The operation input section 22 is provided with various operation keys and conducts input processing according to the key operation made by an operator (an operator of operating the image processing device 12). The image display section 27 includes display elements which form a display image plane such as a liquid crystal display.

The contour image generating section 21 extracts edge points according to the image data acquired by the image acquiring section 11 and generates a contour image of the object. Each edge point is extracted according to a change in the luminance level of the adjoining pixel. Specifically, the edge point is extracted as a pixel, the ratio of the change of the luminance level (referred to as an edge intensity) of which is higher than a predetermined threshold value. A contour image is formed out of a plurality of edge points, which are extracted as described above, and displayed on an image plane in the image display section 27. In this case, the luminance level for each pixel is binarized, and a contour of the object is shown by the edge points.

The matching processing section 26 conducts matching processing according to the acquired image of a work and outputs a result of the discrimination.

The shape information storing section 23 is a non-volatile semiconductor memory for storing shape information to prescribe a shape of a line fitted to the object on the contour image. Concerning this shape information, data to prescribe lines of various shapes is previously stored. In this case, data to prescribe various shapes such as a circle, rectangle and cross is stored as shape information.

The first fitting line generating section 24a fits a line of a predetermined shape to the object on the contour image according to the contour image generated by the contour image generating section 21. A shape of the line to be fitted is designated by the operation input conducted by the operator. According to the designated shape, fitting is conducted.

Specifically, operation is made as follows. When the Hough transformation is conducted on the edge points extracted by the contour image generating section 21, a line of the designated shape is fitted to the object on the contour image, and the first fitting line is generated. The Hough transformation is an analytical technique for projecting the positional coordinates of edge points into a parameter space according to the shape information of the line designated by the operator. A size and position of the line are determined by the Hough transformation, and the first fitting line is extracted from the contour image. In this connection, the Hough transformation for extracting the first fitting line may be conducted on all edge points extracted from the image data. However, the Hough transformation for extracting the first fitting line may be conducted on a portion of the edge points extracted from the image data.

An algorithm for extracting the fitting line by the Hough transformation will be explained below. In general, the Hough transformation is a figure extracting method for extracting a geometrical figure from image data by means of "voting" and "decision by majority". Characteristic points of the image data are "voted" in the parameter space, and a figure is specified by the principle of the decision by majority with respect to the frequency of voting.

For example, a straight line on the x-y coordinate plane can be expressed by the following expression (1) with the parameters $\rho$ and $\theta$ ($0 \leq \theta < \pi$).

$$\rho = x \cos\theta + y \sin\theta \tag{1}$$

That is, when one set of parameters ($\rho$, $\theta$) are designated, one straight line can be extracted by the above expression (1). On the other hand, a set of straight lines (a group of straight lines) passing through a point ($x_o$, $y_o$) on the x-y coordinate plane can be expressed by the following expression (2), which expresses one figure (locus) in the parameter space ($\rho$, $\theta$).

$$\rho = x_o \cos\theta + y_o \sin\theta \quad (2)$$

Accordingly, when three different points on the x-y coordinate plane are located on the same straight line, loci of the group of straight lines passing through the points cross each other at one point in the parameter space. When this principle is utilized, it is possible to extract a figure from the image data. That is, loci, the number of which is n, in the parameter space can be respectively found from the characteristic points, the number of which is n, in the image data. When loci, the number of which is m (m<n), cross each other at one point, it is possible to extract a straight line passing through the characteristic points, the number of which is m, from the intersection point. With respect to figures such as a circle except for a straight line, the figures can be extracted from the image data in the same manner as that of the straight line. Accordingly, when the Hough transformation is conducted while the edge points extracted from the image data are being used as characteristic points, even in the case where blur is caused in an image because the image is out of focus and even in the case where the image quality is deteriorated because of noise, fitting lines, which are a figure expressing the object, can be appropriately extracted.

In the effective edge point region generating section 24b, processing is conducted in such a manner that the first fitting line is made to have a width and a region in the line width is made to be an effective edge point region. The line width to be given to the first fitting line is determined by the fitting accuracy required for the fitting line related to the contour of the object. In the case where a plurality of the first fitting lines is generated, an effective edge point region is generated according to the fitting line, the size of which is the largest.

The image display section 27 displays the effective edge point region, which is generated by the effective edge point region generating section 24b, on the same image plane together with the contour image. The effective edge point region correcting section 24c changes a size and position of the effective edge point region, which is displayed on the image plane, by an operation input made by the operator.

The second fitting line generating section 24d generates the second fitting line, which is formed out of a line of a predetermined shape, according to the edge points located in the effective edge point region on the contour image. It is possible to estimate a size of the second fitting line by a regression calculation according to the edge points located in the effective edge point region. For example, from a pixel unit of edge point position information, a size of the fitting line can be found by a sub-pixel unit which is finer than the pixel unit. In the case where a size and position of the effective edge point region are changed according to an operation input made by the operator, the second fitting line is generated according to the effective edge point region after the size and position are changed. The second fitting line calculated in this way is accommodated in the registration data storing section 25 as registration data and displayed on the image plane by the image display section 27.

In this case, statistical processing is conducted by the least squares method as a regression calculation for calculating the fitting line. In this least squares method, a model, in which a sum of squares of a difference (for example, a distance) between a model (a fitting line) and a measurement point (an edge point) is minimized, is extracted as an optimum value. In this connection, instead of the least squares method, statistical processing may be conducted by the M-estimator estimating method or the L-Med-S (Least Median of Square) estimating method.

Contour Image Generation

Figure 4:
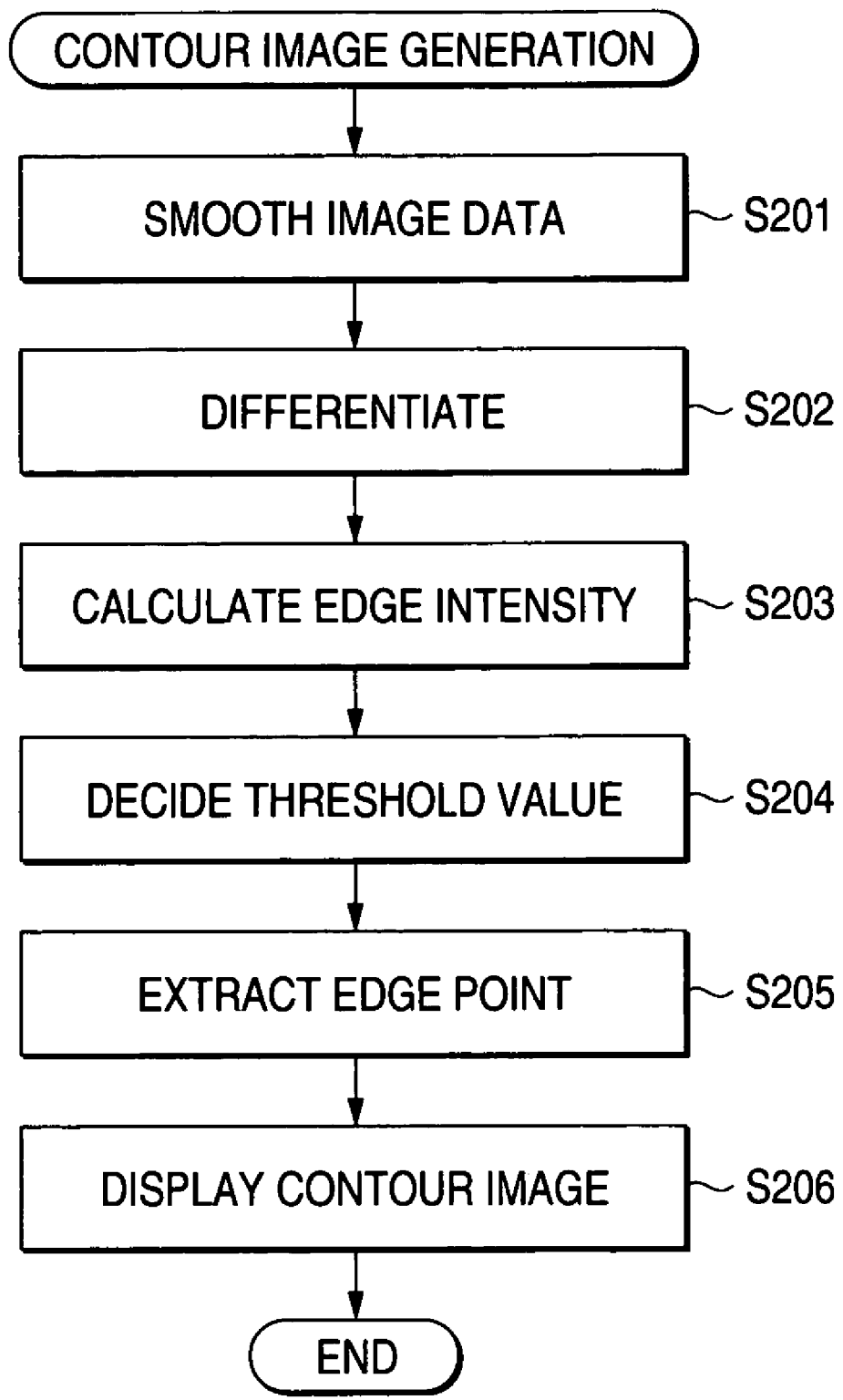
FIG. 4 is a flow chart showing an example of the contour image generating operation in the image processing device shown FIG. 3.

Steps S201 to S206 shown in FIG. 4 are a flow chart showing an example of the contour image generating operation conducted in the image processing device shown in FIG. 3. First, the contour image generating section 21 conducts smoothing processing on the image data acquired by the image acquiring section 11 (step S201). This smoothing processing is a filter processing for removing noise of high frequency in the space axis direction.

Next, after the completion of smoothing processing, the image data is differentiated by a differential filter (step S202). In this differential processing, a change in the luminance level is found with respect to the pixel adjoining in the coordinate axis direction. A ratio of change (differential value) is outputted as an edge intensity component in the coordinate axis direction concerned. The edge intensity component is calculated for each pixel with respect to the x-axis direction and the y-axis direction, and the edge intensity component $E_x$ in the x-axis direction and the edge intensity component $E_y$ in the y-axis direction are respectively outputted.

From the edge intensity component Ex and the edge intensity component $E_y$, calculated in this way, an edge intensity E for each pixel can be found. According to a pixel number distribution curve with respect to the edge intensity E, a threshold value for extracting the edge point is determined (steps S203, S204). The edge intensity E is calculated according to the edge intensity component $E_x$ in the x-axis direction and the edge intensity component $E_y$ in the y-axis direction. Specifically, the edge intensity E is found by the square root of the sum of squares of the components $E_x$ and $E_y$. That is, the edge intensity E is found by the expression of $E=(Ex^2+Ey^2)^{1/2}$. In this connection, from the viewpoint of reducing a load to be processed, the edge intensity may be approximated by a sum of the absolute values of edge intensity components $E_x$ and $E_y$.

The pixel number distribution curve with respect to the edge intensity E is generated according to the frequency distribution (histogram) with respect to the pixel number for each edge intensity E.

A threshold value is determined from the pixel number distribution curve found in this way, and a pixel, the edge intensity E of which exceeds the threshold value, is extracted as an edge point (step S205). A contour image formed out of the extracted edge points is displayed on the image plane by the image display section 27 (step S206).

Figure 5:
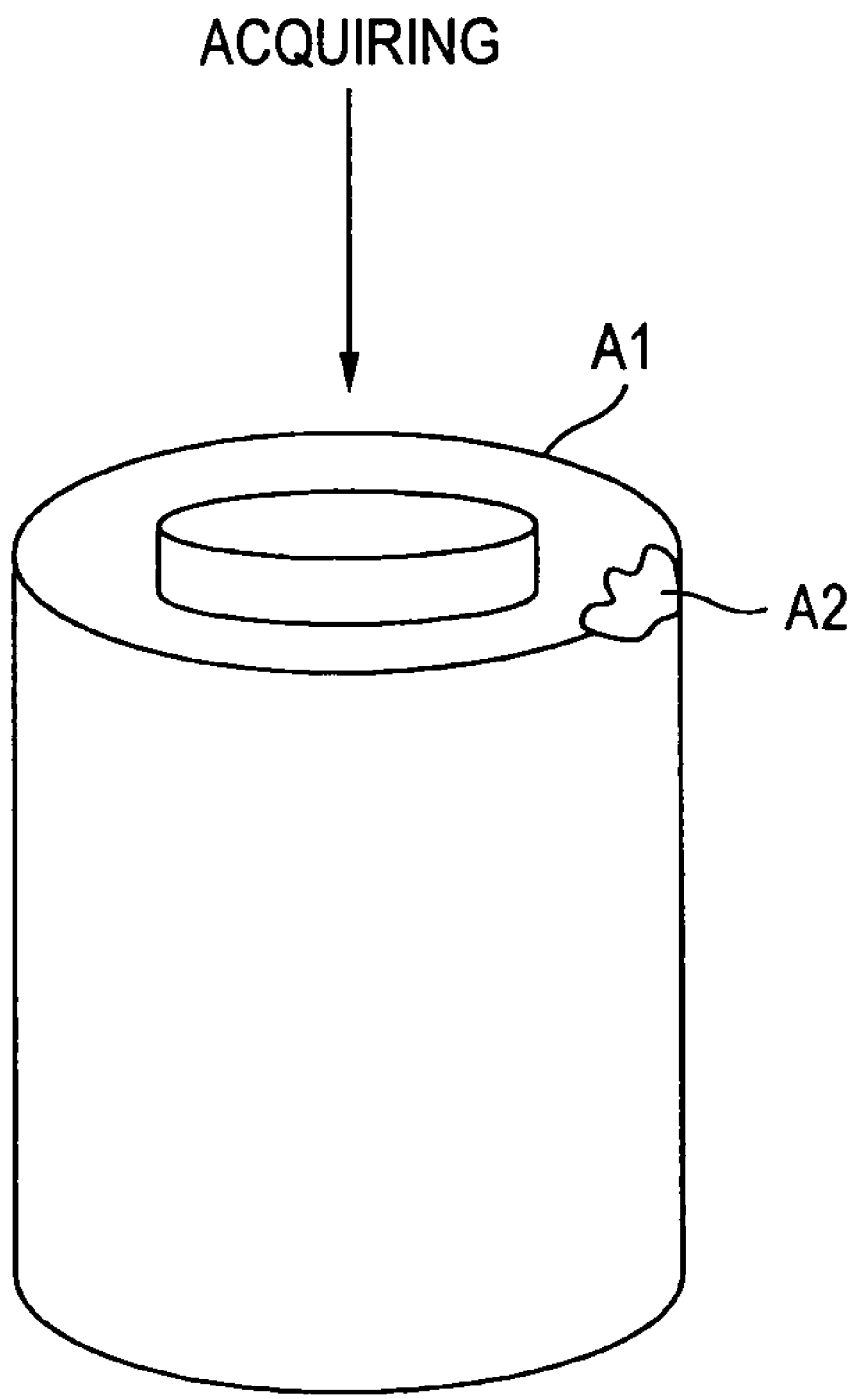
FIG. 5 is a perspective view showing appearance of a work sample.
Figure 6:
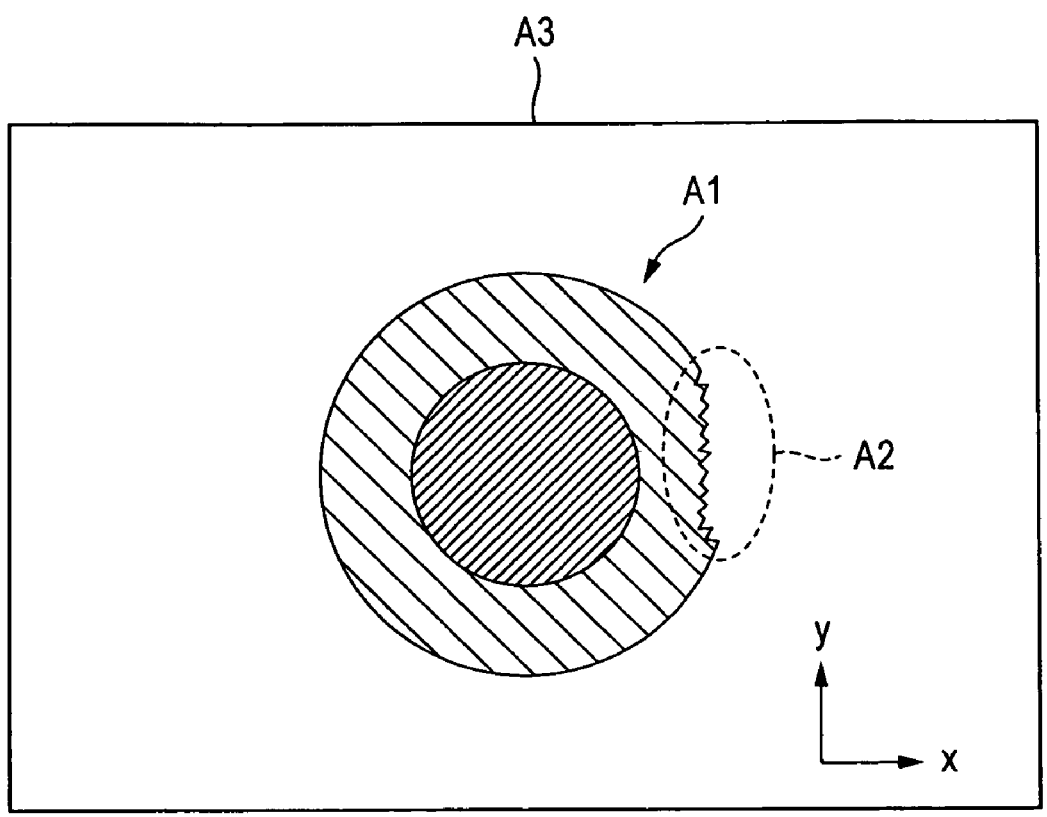
FIG. 6 is a view showing an example of the acquired image which was acquired by the image acquiring section shown in FIG. 3.

FIG. 5 is a perspective view showing appearance of a work sample. FIG. 6 is a view showing an example of the acquired image which was acquired by the image acquiring section shown in FIG. 3. A columnar molding is shown as a sample A1 of the work. A central portion on the end face of this molding is protruded, and a portion A2 of the circumferential edge is broken off.

When this sample A1 is acquired in the direction of the central axis, the acquired image A3 is obtained. On this acquired image A3, the sample A1, which is an object, is shown by grayscale image.

Figure 7:
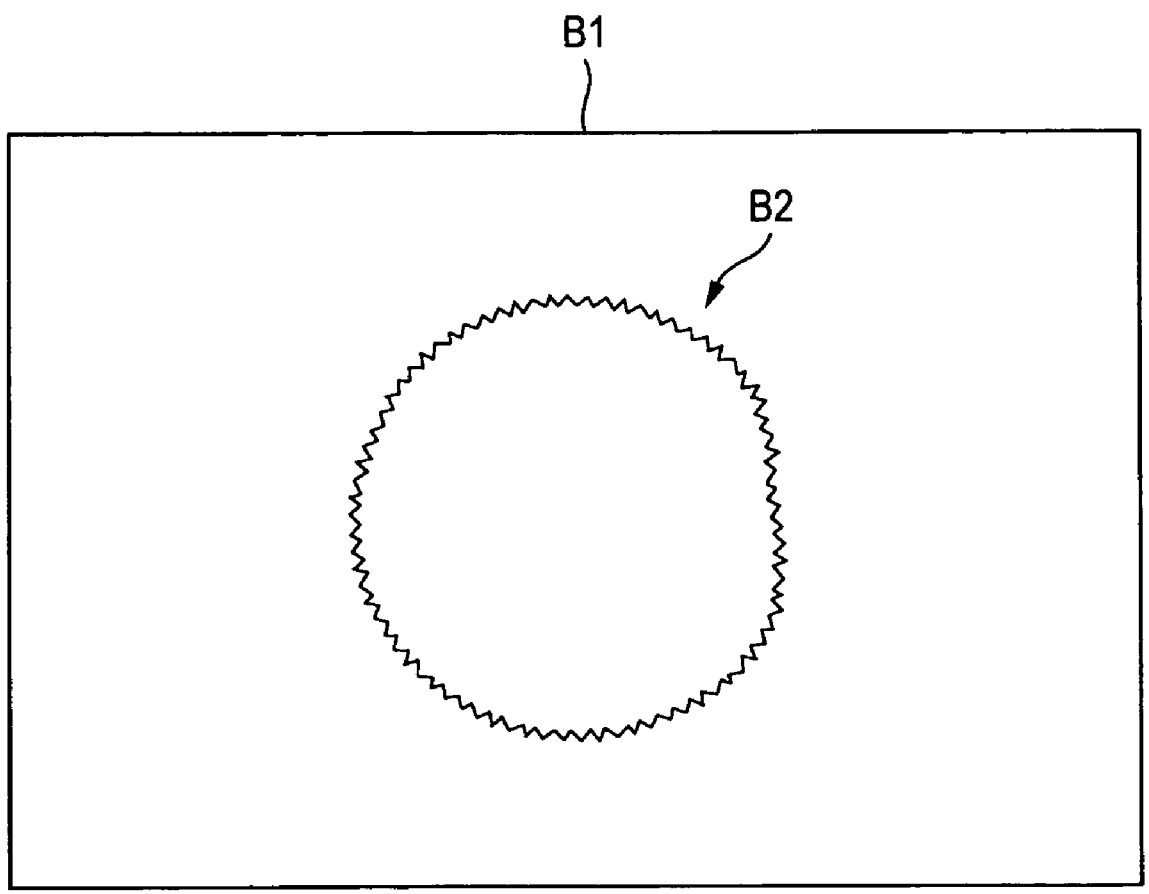
FIG. 7 is a view showing an example of the contour image generating operation according to the acquired image shown in FIG. 6.

FIG. 7 is a view showing an example of the contour image generating operation according to the acquired image shown in FIG. 6. In this view, a contour image B1 formed out of a plurality of edge portions B2 is shown. The contour image B1 is formed out of a large number of edge points B2 extracted by the threshold value processing. In this case, an outline of the contour of the object is shown by polygonal lines connecting the adjoining edge points with straight lines. Since the circumferential portion A2 of the object is broken off, this contour image B1 is formed into a circle, one portion of which is flattened.

In the case where a portion of the sample A1 of the work is broken off, the contour image B1 is deformed in such a manner that the shape of the contour image B1 is greatly displaced from a desired fitting line. Therefore, when a simple regression calculation is conducted on all edge points which are extracted, it is impossible to properly extract a fitting line with respect to the contour of the object. Therefore, edge points appropriate for extracting the fitting line are selected with the effective edge point region.

Extraction of Effective Edge Point Region

Figure 8:
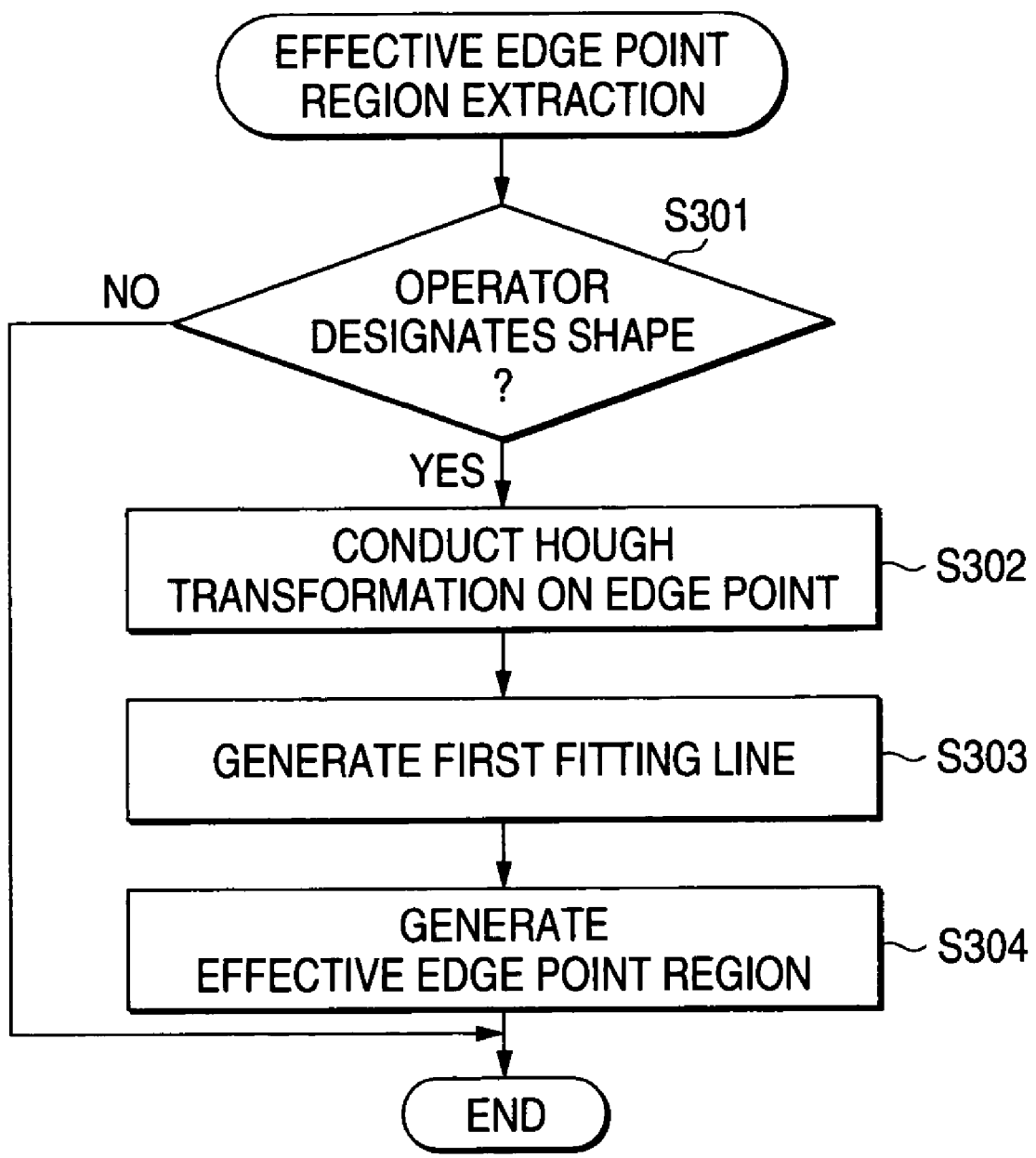
FIG. 8 is a flow chart showing an example the effective edge point region extracting operation in the image processing device shown in FIG. 3.

Steps S301 to S304 shown in FIG. 8 are a flow chart showing an example of the effective edge point region extracting operation conducted in the image processing device shown in FIG. 3. After the contour image has been displayed on the image plane, a shape of the fitting line is designated by the operation input conducted by an operator. Then, according to the shape information, the edge points are subjected to the Hough transformation and the first fitting line is found (steps S301 to S303).

For example, in the case where "a circle" is designated as a shape of the fitting line, a circle, which is the most appropriate for the contour image, is estimated by the Hough transformation with respect to all edge points extracted by the contour image generating section 21. In the case where "a rectangle" is designated as a shape of the fitting line, four straight lines are found by the Hough transformation with respect to the edge points. According to the intersection point of the straight lines found in this way, four line segments are cut out, and a rectangle is estimated which is the most appropriate for the contour image as a figure formed out of four line segments. In the case where "a cross" is designated as a shape of the fitting line, eight straight lines are found by the Hough transformation with respect to the edge points. Then, twelve line segments are cut out according to the intersection point of the straight lines, and a cross is estimated which is the most appropriate for the contour image as a figure formed out of twelve line segments.

Next, while the first fitting line is being made to have a width, an effective edge point region is generated and displayed on the image plane (step S304). In the case where a plurality of the first fitting lines is extracted, the effective edge point region is generated according to the fitting line, the size of which is the largest.

Figure 9:
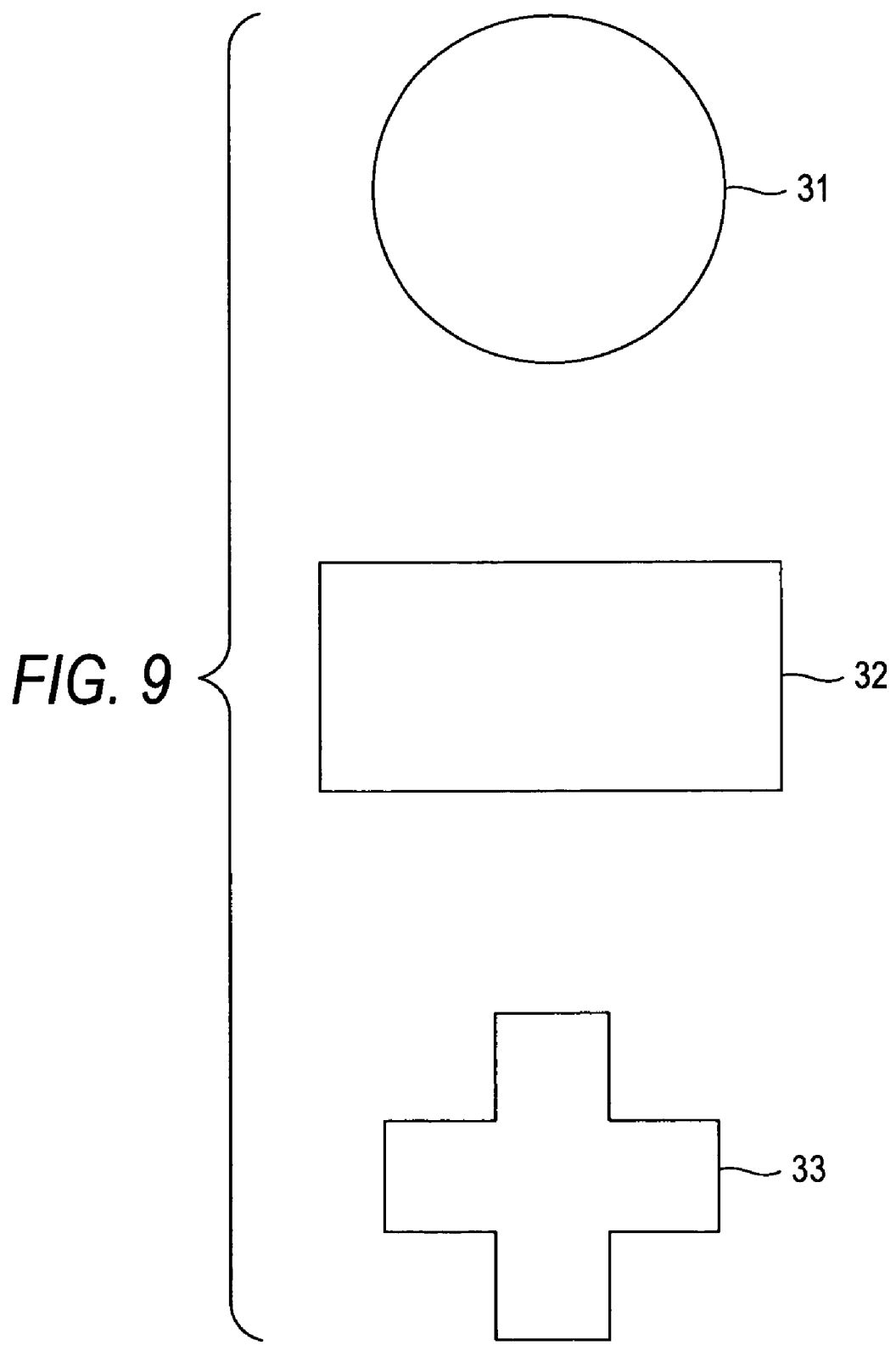
FIG. 9 is a view showing an example of the shape information used for extracting the effective edge point region in the image processing device shown in FIG. 3.

FIG. 9 is a view showing an example of the shape information used for extracting the effective edge point region in the image processing device shown in FIG. 3. In this view, "a circle", "a rectangle" and "a cross" are shown as designated shapes. As a shape of the fitting line, the circle 31, the rectangle 32 and the cross 33 are used.

Figure 10:
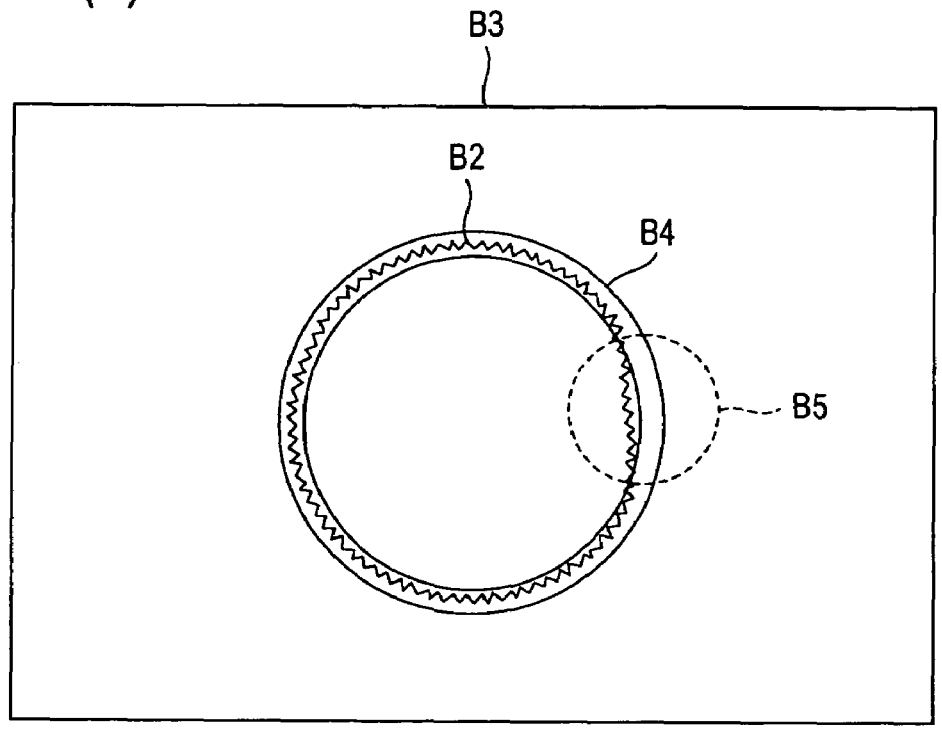
FIGS. 10(a) to (b) are views showing an example of the effective edge point region extracting operation in the image processing device shown in FIG. 3.
Figure 10:
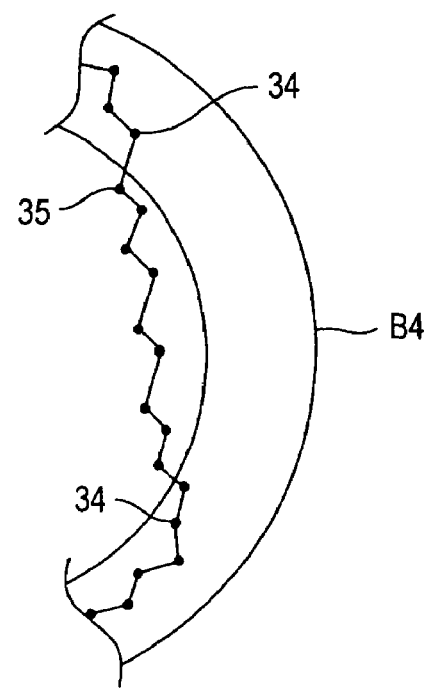

FIGS. 10(a) and 10(b) are views showing an example of the effective edge point region extracting operation in the image processing device shown in FIG. 3. FIG. 10(a) shows a plurality of edge points B2 and an effective edge point region B4 on the display image plane B3. FIG. 10(b) is an enlarged view of one portion B5. The effective edge point region B4 is shown being overlapped by a large number of edge points B2 composing the contour image.

The effective edge point region B4 is formed in such a manner that the first fitting line is made to have a width, wherein the first fitting line is obtained when a line of a predetermined shape (a circle in this case) is fitted to the contour image of the object formed out of a large number of edge points B2. The second fitting line related to the contour of the object is calculated according to the edge point 34 which is located at a position overlapped by the effective edge point region B4. That is, a regression calculation is made while excluding the edge point 35 which is located at a position not overlapped by the effective edge point region B4 in a large number of edge points B2 extracted from the image data.

When the second fitting line is calculated from the edge point 34 included in the overlapping portion with the effective edge point region B4 in the contour image, the edge point 35 not overlapped by the effective edge point region B4 is excluded from a group of data for calculating the fitting line. Therefore, the fitting line can be found while an edge point, which is greatly displaced from a desired fitting line, is being excluded.

Figure 11:
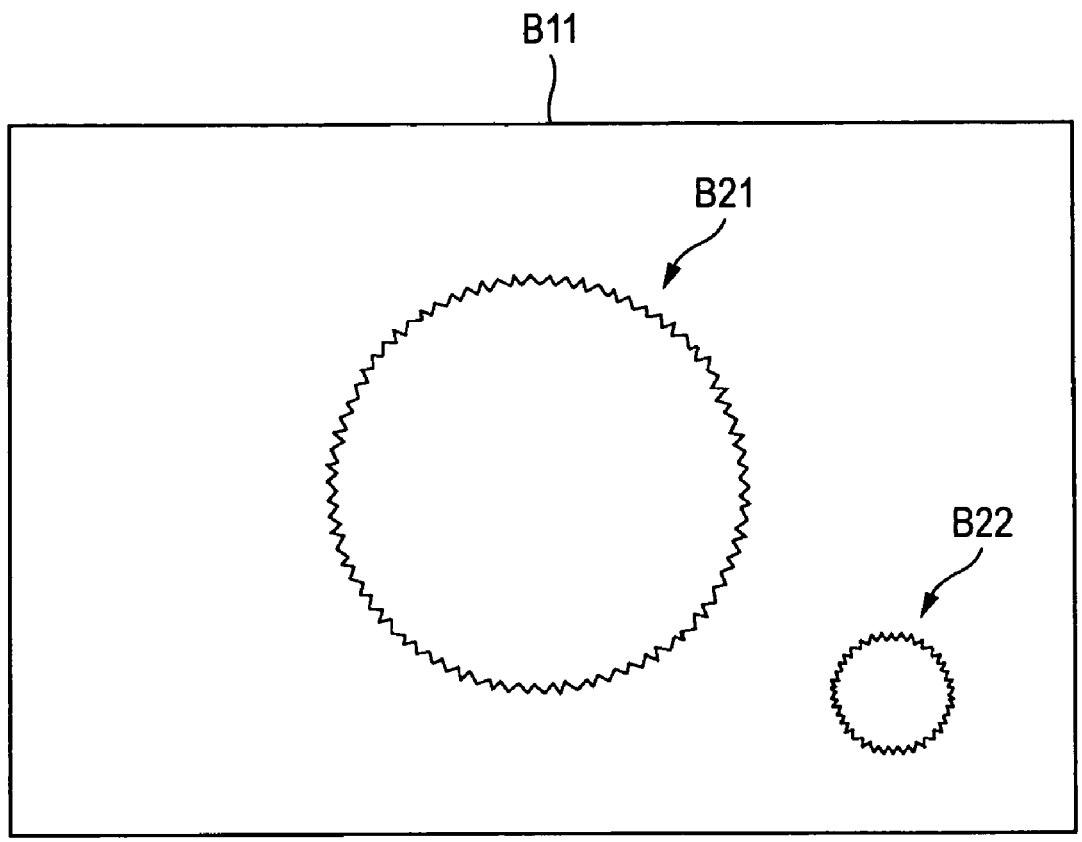
Figure 12:
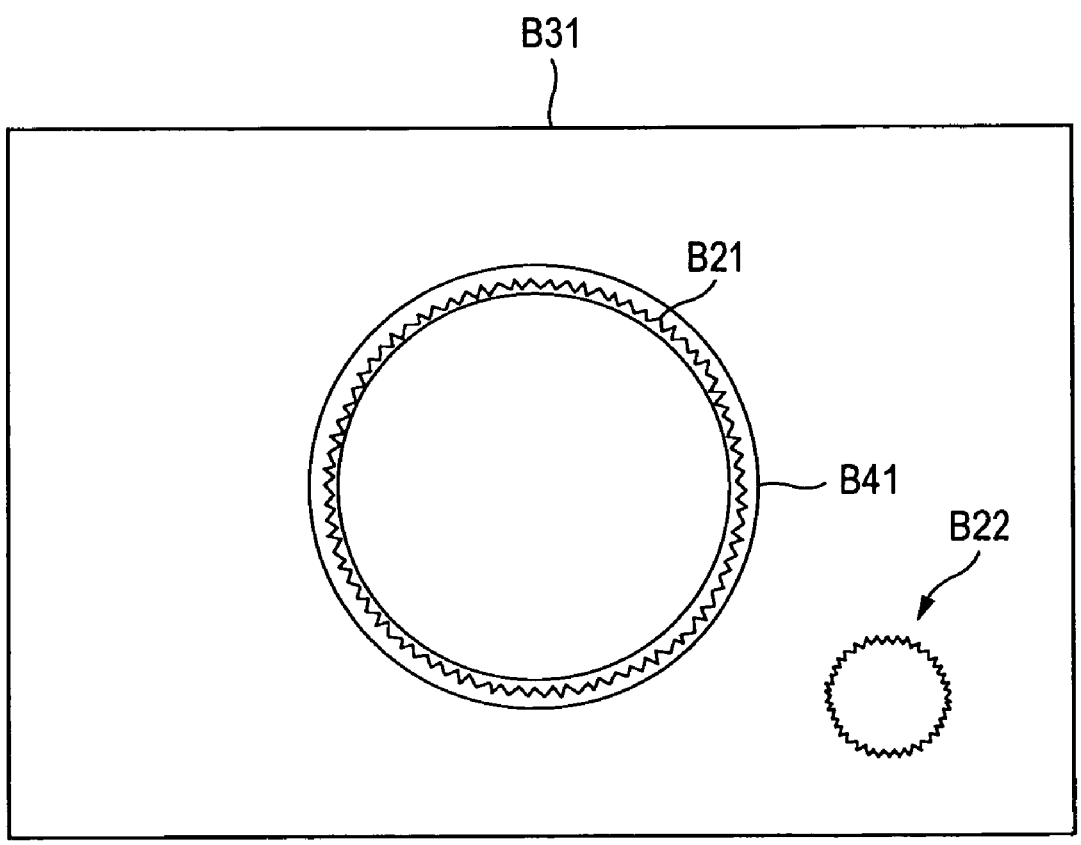
FIG. 12 shows circumstances of the effective edge point region B41 on the display image plane B31 generated according to the contour image shown FIG. 11.

FIG. 11 is a view showing another example of the generated contour image. FIG. 11 shows circumstances in which a plurality of contours B21 and B22 are extracted as the contour image B11. FIG. 12 shows circumstances of the effective edge point region B41 on the display image plane B31 generated according to the contour image of FIG. 11.

In the case where a plurality of contours B21 and B22 are extracted from the image data as the contour image B11, the effective edge point region B41 is generated only for the contour B21, the size of which is the largest.

Registration Data Generation

Figure 13:
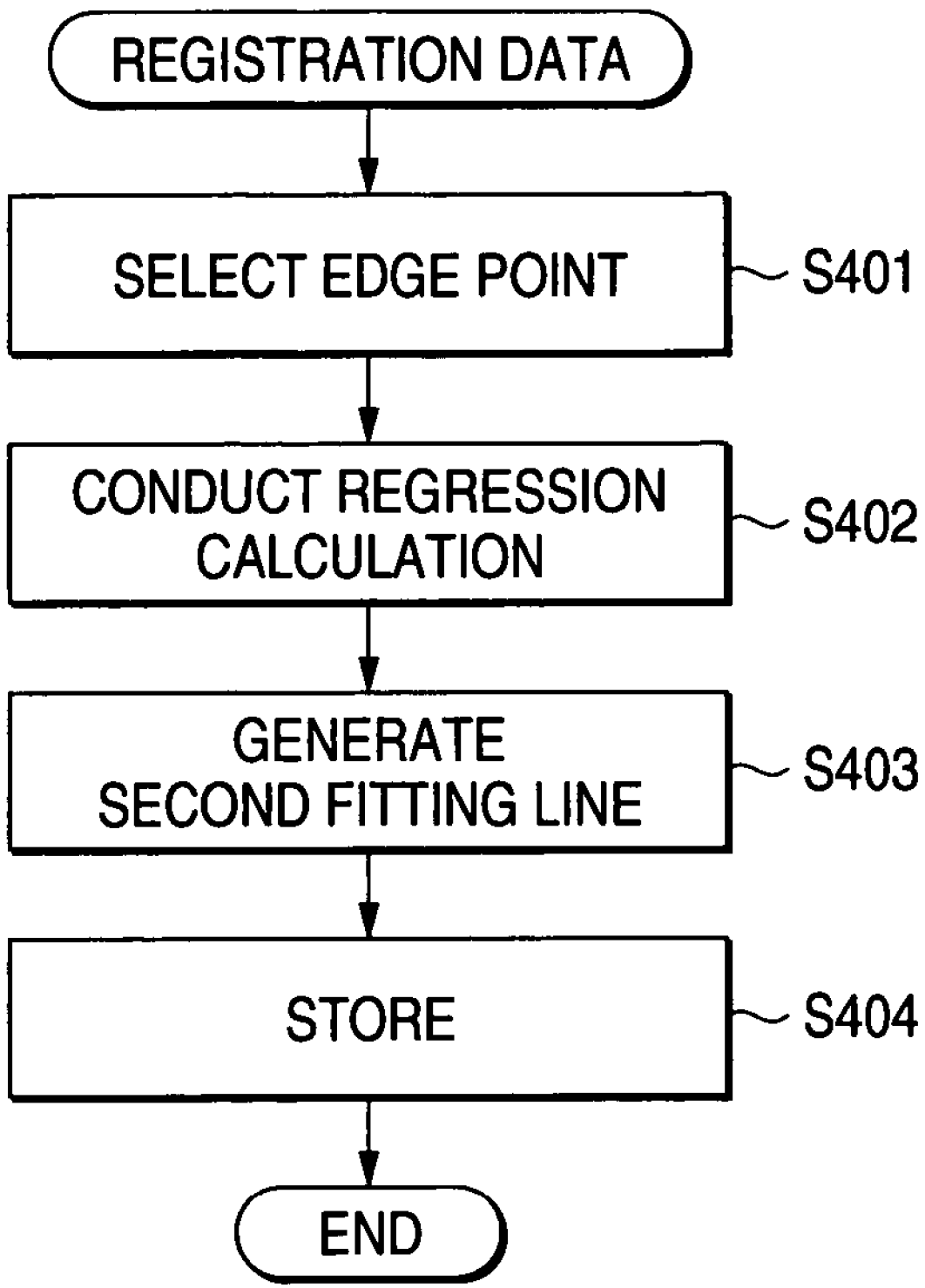
FIG. 13 is a flow chart showing an example of the registration data generating operation in the image processing device shown in FIG. 3.

Steps S401 to S404 shown in FIG. 13 are a flow chart showing an example of the registration data generating operation in the image processing device shown in FIG. 3. First, the second fitting line generating section 24d selects an edge point according to the effective edge point region (step S401).

Next, a regression calculation is made for the selected edge point, and the second fitting line is calculated (steps S402, S303). The second fitting line, which has been calculated, is stored in the registration data storing section 25 as the registration data and displayed on the image plane (step S404).

Figure 14:
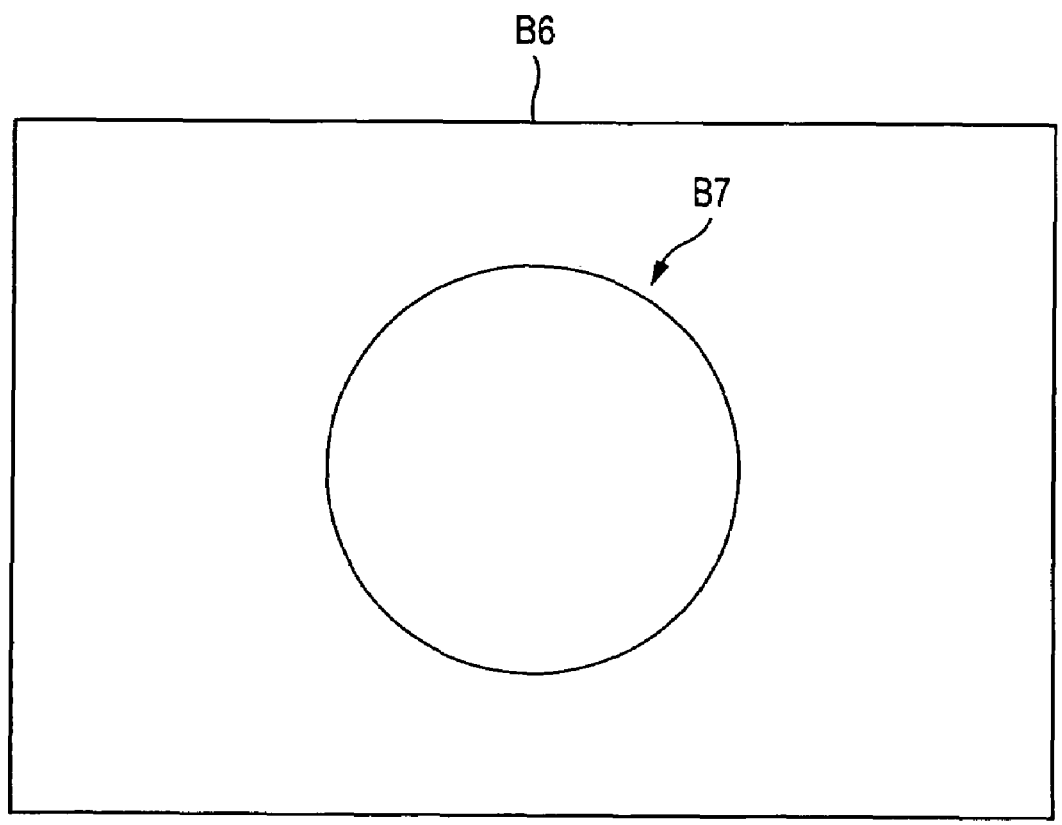

FIG. 14 is a view showing an example of the registration data generating operation in the image processing device shown in FIG. 3. FIG. 14 shows the registration data B6 including the second fitting line B7. The second fitting line B7 (the circle in this case), which is a contour of the object, is found by a regression calculation and displayed on the image plane as the registration data B6.

According to this embodiment, the fitting line related to the contour of the object can be found from the edge point located in the effective edge point region. Therefore, even in the case where the object itself has a defect, for example, even in the case where a portion of the object itself is broken off, the fitting accuracy can be prevented from deteriorating. Further, even when a different operator operates the image processing device, the fitting accuracy is not deteriorated and the fitting line can be properly found at all times. Even in the case where blur is caused in an image because the image is out of focus and even in the case where the image quality is deteriorated by noise, it is possible to prevent the fitting accuracy from deteriorating. Therefore, the quality of the registration data can be enhanced.

Since a size and position of the effective edge point region can be changed by an operation input made by an operator, in the case where a fitting line generated by the first fitting line generating section 24a is greatly different from a desired fitting line on the image plane, it is possible to extract a desired fitting line by correcting the size and position of the effective edge point region. Further, even in the case where a shape of the contour image of the object is remarkably different from a desired fitting line according to a acquiring angle at the time of acquiring the object, since the edge point is selected by the effective edge point region, it is possible to generate registration data formed out of an ideal fitting line.

In this embodiment, explanations are made into an example in which a fitting line is found according to the Hough transformation with respect to all edge points. However, it should be noted that the present invention is not limited to this specific embodiment. For example, in the case where a figure to be extracted is a circle, a fitting line may be found in such a manner that three points are selected from the edge point at random and a circle, which passes the thus selected edge points, is determined to be the fitting line.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. An image processing device comprising:
   a contour image generation unit for extracting edge points according to image data acquired by an image acquiring unit and generating a contour image of an object formed out of the edge points;
   a first fitting line generation unit for conducting fitting of a line of a predetermined shape to the object on the contour image according to the contour image and generating a first fitting line;
   an effective edge point region generation unit for generating an effective edge point region in which the first fitting line has a width and a region in the line width is made to be the effective edge point region; and
   a second fitting line generation unit for generating a second fitting line formed out of a line of a predetermined shape according to the edge points in the effective edge point region on the contour image.

2. An image processing device according to claim 1, wherein the first fitting line generation unit conducts fitting according to the Hough transformation related to the contour image.

3. An image processing device according to claim 1, wherein the effective edge point region generation unit generates the effective edge point region according to a fitting line, the size of which is the largest, in the case where a plurality of the first fitting lines are generated.

4. An image processing device according to claim 1, further comprising:
   a display unit for displaying the effective edge point region together with the contour image on the same image plane; and
   an effective edge point region correction unit for changing a size and position of the effective edge point region, which are displayed on the image plane, according to an operation input made by an operator,
   wherein the second fitting line generation unit generates the second fitting line according to the effective edge point region, the size and position of which have been changed.

* * * * *